UNITED STATES PATENT OFFICE.

DU BOIS D. PARMELEE, OF SALEM, ASSIGNOR TO JOHN A. GREENE, OF BEVERLY, MASSACHUSETTS.

IMPROVEMENT IN THE MANUFACTURE OF HOLLOW MOLDED RUBBER GOODS.

Specification forming part of Letters Patent No. 26,286, dated November 29, 1859.

*To all whom it may concern:*

Be it known that I, DU BOIS D. PARMELEE, of Salem, in the county of Essex and State of Massachusetts, have invented a new and useful method or process of making hollow molded articles from india-rubber or its equivalent and their compounds; and I do hereby declare the following to be a full and clear description thereof.

My invention relates to the manufacture of india-rubber articles, which, for the purpose of giving to them the parmanent qualities of vulcanized rubber, are treated in the cold way by dipping the same in solutions prepared according to either of the known processes; and my invention consists in a mode or method of giving sheets of such rubber—*i. e.*, when free of sulphur and previous to their being hermized or treated in the cold way, as set forth—the exact shape or configuration of the inside of the mold by expanding the same within the mold, in the manner hereinafter described.

A method heretofore adopted of making hollow molded articles including toys from india-rubber or its equivalent and their compounds, has been to take a sheet of prepared rubber, previous to vulcanization under the application of heat, and cut and partially close it to form a bag or rough hollow figure of suitable size for the mold. Then to introduce in said bag one or more drops of water and afterward hermetically seal or close the bag by pressing together the edges of the rubber at the place of opening in the bag. Thus prepared the rubber bag is inserted in the mold, and, having the requisite amount of sulphur in its composition to effect its vulcanization, the closed mold, with its contents, is subjected to the requisite high temperature and for the necessary period of time to perfect the vulcanization of the rubber. This heated exposure, however, also causes the water in the rubber bag to be converted into steam or vapor, and by the inward pressure thereby produced to in a measure expand and force the rubber into the various cavities of the mold, so as to secure for the rubber article its desired form or impression. Such method or process has many disadvantages and difficulties attending its proper action or management, only some of which it may be necessary here to refer to, after I have described my present method or process, and by way of contrasting the same in certain respects with the former process.

The following, without any special allusion to the self-evident changes or mere modifications, will suffice to explain my present new process.

I make a bag of two or more sheets of crude india-rubber or its compounds, as distinguishable from a rubber composition or material having sulphur combined with it for vulcanization by heat. These sheets are cut to form a bag, the shape of which approximates to the figure the finished article is designed to be molded to, or so that it will approach the intended shape. Said sheets are then cemented together at their edges, with the exception of a small opening left at some one part, into which I insert the end of a pipe that communicates with a small air force-pump. Air is then forced into the bag by the pump till the bag becomes more or less inflated, when the pump, with its pipe, is detached, and the hole in the bag stopped up by a small india-rubber plug or cap. This inflated bag, of a form approaching that of the mold, is now placed in the divided mold and the mold closed and perfectly clamped or secured. The mold is then exposed to the action of a high temperature, but not so high as to effect the melting of the rubber or its compound. This may be done practically in an oven and preferably in a dry atmosphere. The mold is afterward removed from the oven and allowed to cool. The length of time for exposure to heat, as described, will vary with the temperature of the oven and thickness of the mold. Thus a mold of a given thickness placed in an oven heated to a temperature of 220° Fahrenheit, which is about the highest temperature that should be used, since 228°, or thereabout, is the usual melting-point of pure rubber, will require from three to five minutes from the period the mold becomes thoroughly heated. If the oven be of a less temperature—of, for instance, from 180° to 200°—about fifteen minutes' exposure will suffice; or if 150° be the temperature of the oven, which is as low as generally suitable for practical purposes, then the mold should be kept heated for an hour, or thereabout.

Before putting the bag into the mold it should be powdered over with crushed soapstone, plumbago, lamp-black, oxide of zinc, or any other suitable powder, for the purpose of preventing the rubber from sticking to the mold. Likewise the mold should be allowed sufficient time to cool down after taking it out of the oven and before removing the molded article, as it would injure said article to open the mold previously by reason of the heated and expanded air acting with a pressure on the inside of the molded article that might burst the latter or cause it to assume a form different from that of the mold. In this way the rubber is caused to assume the exact shape of the inside of the mold and made to permanently retain such form, subject, of course, to the well-known properties of rubber to be temporarily compressed or expanded at pleasure by the application of mechanical force. The cooling of the article in the mold will not affect the figure; but said molded article will preserve the finest lines given to it by the mold with the greatest precision. When properly set the molded article may be vulcanized by dipping it in a hermizing solution, or in any other suitable cold way, as distinguishable from the application to heat on rubber prepared with sulphur, as heretofore adopted for the manufacture of like articles.

By this my present-described process clay, oxides, carbonates, and other earthy substances may be mixed with the rubber or rubber compound, and by such additions a finer cast or impression may be taken. Such would not be practicable in a general way, if at all, where sulphur was combined with the rubber to effect vulcanization by heat during the process of molding, as heretofore practiced.

In the manufacture of hollow molded articles of rubber or its compounds by this my present-described method, it will be obvious that the air confined in the bag is expanded by the heat, and the air outside of the bag, and between the bag and the mold, is rarefied and caused to escape through the crevices or joints of the mold. In addition to the advantages above stated for this method of manufacture over or as compared with the combined use of water and rubber prepared with sulphur for vulcanization by heat in the act of molding, it may be observed that there is here less accuracy required and less danger of explosion or injury to the mold or article being molded than where water to be converted into steam or vapor is used; also, that by this my method a very important economy is produced in the manufacture of such articles, as it is a common occurrence for the molded article when taken from the mold to turn out a "wastrel" or failure, and which may be caused under both processes of manufacture by the operator imperfectly cementing the bag from which the article is to be formed, or by his defective cut of the same in size or shape, or which may be caused by a variety of other circumstances. In such cases of failure the rubber, being vulcanized when taken from the mold under the method of manufacture previously practiced, is comparatively or wholly worthless, while under my present-described method of manufacture the rubber, being unvulcanized, is as good, or nearly as good, as ever, and may readily be reworked.

I claim—

In the manufacture of hollow articles of india-rubber or its equivalent, or their compounds, the method herein described of shaping the said articles in molds preparatory to their being vulcanized or hermized—*i. e.*, treated in the cold way by any known process—by applying heat to bags made of india-rubber, its equivalent, or their compound free from sulphur and inflated with air, so as to snugly fit the molds, in the manner substantially as set forth.

In testimony whereof I have signed my name to this specification before two subscribing witnesses.

DU BOIS D. PARMELEE.

Witnesses:
A. POLLAK,
EDM. F. BROWN.